(12) United States Patent
Moore, III (10) Patent No.: US 6,453,476 B1
(45) Date of Patent: Sep. 24, 2002

(54) PROTECTIVE HELMET

(75) Inventor: Dan T. Moore, III, Cleveland Heights, OH (US)

(73) Assignee: Team Wendy, LLC, Cleveland, OH (US)

(*) Notice: Subject to any disclaimer, the term of this patent is extended or adjusted under 35 U.S.C. 154(b) by 0 days.

(21) Appl. No.: 09/742,986

(22) Filed: Dec. 21, 2000

Related U.S. Application Data (60) Provisional application No. 60/235,759, filed on Sep. 27, 2000.

(51) Int. Cl.[7] ................................................. A42B 3/00
(52) U.S. Cl. ............................................................ 2/412
(58) Field of Search ............................... 2/411, 412, 414, 2/425

(56) References Cited

U.S. PATENT DOCUMENTS

| | | | |
|---|---|---|---|
| 2,908,943 A | * | 10/1959 | Miller |
| 3,501,772 A | * | 3/1970 | Wyckoff |
| 3,818,508 A | * | 6/1974 | Lammers et al. |
| 3,869,413 A | | 3/1975 | Blankenship |
| 3,882,546 A | | 5/1975 | Morton |
| 3,934,271 A | | 1/1976 | Rhee |
| 3,946,441 A | * | 3/1976 | Johnson |
| 3,968,089 A | | 7/1976 | Cuscurida et al. |
| 3,992,722 A | | 11/1976 | Rhee |
| 4,006,496 A | * | 2/1977 | Marker |
| 4,016,734 A | | 4/1977 | Morton |
| 4,020,507 A | | 5/1977 | Morton |
| 4,044,399 A | | 8/1977 | Morton |
| 4,058,854 A | | 11/1977 | Rhee |
| RE29,487 E | | 12/1977 | Gardner, Jr. |
| 4,060,855 A | | 12/1977 | Rappleyea |
| 4,101,983 A | | 7/1978 | Dera et al. |
| 4,114,197 A | | 9/1978 | Morton |
| 4,116,893 A | | 9/1978 | Flanagan |
| 4,125,487 A | | 11/1978 | Olstowski |
| 4,158,087 A | | 6/1979 | Wood |
| 4,190,712 A | | 2/1980 | Flanagan |
| 4,193,396 A | | 3/1980 | Wacker |
| 4,212,954 A | | 7/1980 | Nomura et al. |
| 4,326,303 A | | 4/1982 | Rappleyea |
| 4,434,514 A | | 3/1984 | Sundahl et al. |
| 4,484,361 A | | 11/1984 | Leighton et al. |
| 4,698,856 A | | 10/1987 | Arai |
| 4,722,946 A | | 2/1988 | Hostettler |
| 4,808,469 A | * | 2/1989 | Hiles |
| 4,866,102 A | | 9/1989 | Pray et al. |
| 4,980,386 A | * | 12/1990 | Tiao et al. |
| 5,023,958 A | * | 6/1991 | Botzin |
| 5,056,162 A | | 10/1991 | Tirums |
| 5,088,130 A | | 2/1992 | Chiarella |
| 5,099,523 A | | 3/1992 | Broersma |
| 5,175,195 A | | 12/1992 | Tani et al. |
| 5,203,352 A | | 4/1993 | Gardner, Jr. |
| 5,298,208 A | | 3/1994 | Sibley et al. |
| 5,309,576 A | * | 5/1994 | Broersma |
| 5,332,760 A | | 7/1994 | Weisman |
| 5,418,257 A | | 5/1995 | Weisman |

(List continued on next page.)

FOREIGN PATENT DOCUMENTS

GB      2202729      * 10/1988

OTHER PUBLICATIONS

O.L1. Davies and N.J. Mills, The Rate Dependence of Confor Polyurethane Foams, *Cellular Polymers,* vol. 18, No. 2, 1999, pp. 117–136.

*Primary Examiner*—Rodney M. Lindsey
(74) *Attorney, Agent, or Firm*—Pearne & Gordon LLP (57) ABSTRACT

A protective helmet is provided which preferably has a hard outer shell and an energy-absorbing liner. The liner is made of low resilience or slow-recovery viscoelastic foam which is compression rate sensitive.

20 Claims, 2 Drawing Sheets

U.S. PATENT DOCUMENTS

| | | |
|---|---|---|
| 5,450,631 A | 9/1995 | Egger |
| 5,544,367 A | 8/1996 | March, II |
| 5,619,756 A * | 4/1997 | Garneau |
| 5,661,854 A | 9/1997 | March, II |
| 5,734,994 A | 4/1998 | Rogers |
| 5,781,935 A | 7/1998 | Bassett et al. |
| 5,862,528 A | 1/1999 | Saijo et al. |
| 5,919,395 A * | 7/1999 | Bastin et al. |
| 5,930,840 A | 8/1999 | Arai |
| 5,943,706 A | 8/1999 | Miyajima et al. |
| 5,946,734 A | 9/1999 | Vogan |
| 5,950,244 A | 9/1999 | Fournier et al. |
| 5,996,126 A | 12/1999 | Barthold et al. |
| 6,028,122 A | 2/2000 | Everitt et al. |
| 6,070,271 A | 6/2000 | Williams |
| 6,093,468 A | 7/2000 | Toms et al. |
| 6,108,825 A * | 8/2000 | Bell et al. |
| 6,154,889 A | 12/2000 | Moore, III et al. |

* cited by examiner

PROTECTIVE HELMET

This application claims the benefit of U.S. Provisional Application Serial No. 60/235,759 filed Sep. 27, 2000, the entire contents of which are incorporated herein by reference in their entirety.

FIELD OF THE INVENTION

The invention relates to protective helmets and more particularly to protective helmets having an energy-absorbing foam liner or shell therein.

BACKGROUND OF THE INVENTION

Head injury is a significant cause of accidental death and disability among children and adults in the United States and other countries, frequently resulting from activities such as bicycling, skiing, horseback riding, skateboarding, snowboarding, ice skating, rollerskating, and in-line skating. In general, head injuries fall into two main categories-focal and diffuse. Focal injuries are limited to the area of impact, and include contusions, hematomas, lacerations and fractures. Diffuse brain injuries involve trauma to the neural and vascular elements of the brain at the microscopic level. The effect of such diffuse damage may vary from a completely reversible injury, such as a mild concussion, to prolonged coma and death.

In recent years, two-thirds of all bicycle-related deaths involved head injuries. A 1993 study by the Consumer Product Safety Commission found that about 18% of bicyclists wear helmets. Research has shown that helmets may reduce the risk of head injury to bicyclists by 85%.

There are three general categories of protective helmets used by sporting participants.

1. Hard shell helmets having a hard outer shell, typically made of a thermoplastic material such as polycarbonate or ABS, an inner shell or energy-absorbing liner made of expanded polystyrene (EPS) or expanded polypropylene (EPP), and optionally a comfort liner or comfort pads of flexible foam inside the EPS liner.
2. Foam helmets made of a thick layer of EPS or EPP with no outer shell and optionally a comfort liner or comfort pads inside.
3. Microshell helmets having a thin outer microshell (0.2–0.5 mm thick) made of a thermoplastic vacuum-shaped material such as polyethylene over a relatively thicker inner shell or liner of EPS or EPP and an optional comfort liner or comfort pads.

EPS consists of plastic cells that have been bonded together in the shape of a helmet during the molding process. When subjected to an impact, the cells of an EPS helmet will "crush", or permanently deform, thereby protecting the wearer by attenuating the energy of the impact. However, the EPS helmet liners are rigid, inelastic, with very little flexibility. Because of this, they are "single impact" helmets, and have serious deficiencies in their energy attenuation characteristics.

Prior art protective helmets include those described in U.S. Pat. Nos. 5,088,130; 5,298,208; 5,943,706; 6,070,271; 6,154,889, the entire contents of which are incorporated herein by reference in their entirety.

There is a need for an energy-absorbing foam liner which more effectively provides protection to the wearer of a protective helmet.

SUMMARY OF THE INVENTION

A protective helmet is provided comprising an energy-absorbing shell. A substantial portion of the energy-absorbing shell is viscoelastic foam. The helmet preferably includes a resin outer shell. The viscoelastic foam is compression rate sensitive.

DETAILED DESCRIPTION OF THE PREFERRED EMBODIMENTS OF THE INVENTION

As used herein, when a range such as 5–25 or 5 to 25 is given, this means preferably at least 5 and, separately and independently, preferably not more than 25. "Stress" means force per unit area. Stress is frequently measured in $N/m^2$ or Pa. "Strain", with regard to thickness as used herein, is the ratio of the change in thickness, $\Delta T$, to the original thickness, $T_0$, and is therefore a dimensionless quantity.

Figures 1, 2, 4, 5:
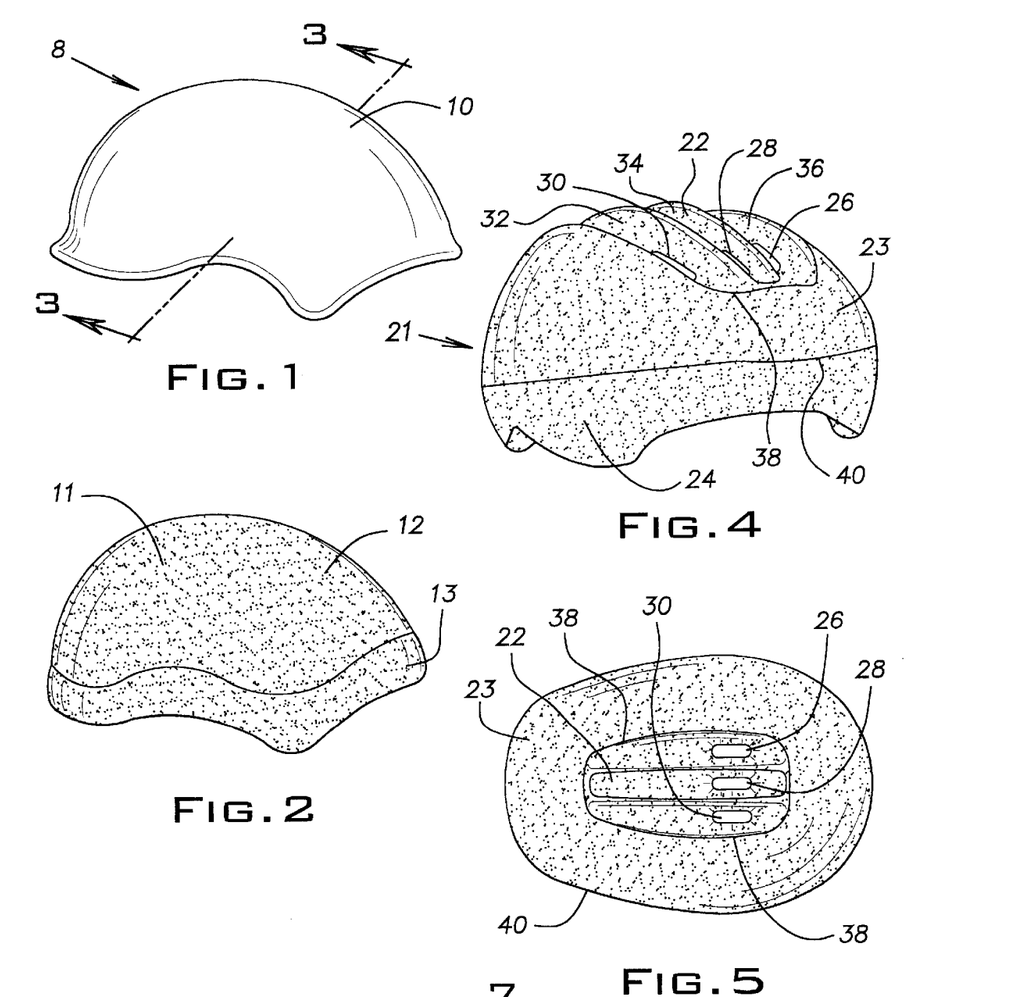
FIG. 1 is a perspective view of a protective helmet according to the present invention.
FIG. 2 is a perspective view of an energy-absorbing liner or shell of a protective helmet according to the present invention.
FIG. 4 is a perspective view of an energy-absorbing liner or shell of a protective helmet according to the present invention.
FIG. 5 is a top view of the liner or shell of FIG. 4.
Figure 3:
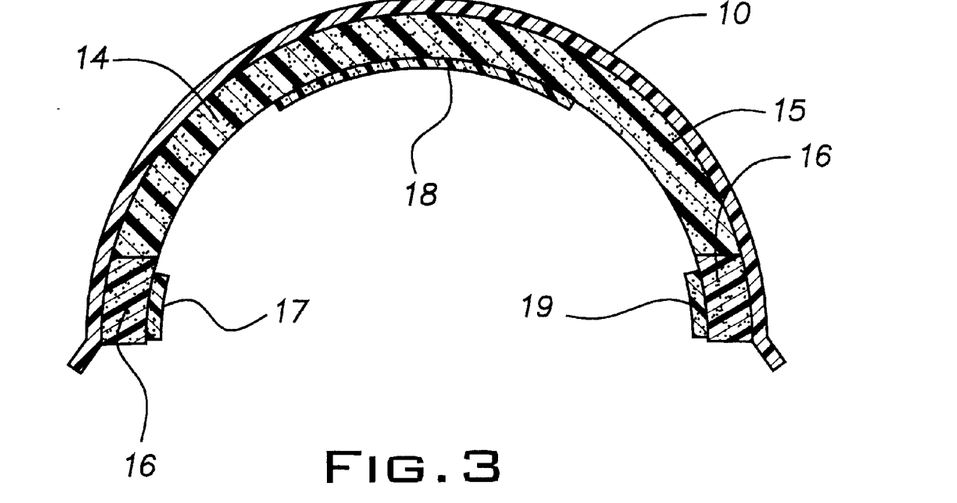
FIG. 3 is a cross sectional view taken along line 3—3 of FIG. 1.

With reference to FIGS. 1 and 3, there is shown a protective helmet 8 such as a ski or snowboard helmet having a hard outer shell 10 which is a resin outer shell. With reference to FIG. 3, the helmet has an energy-absorbing or impact attenuating liner or inner shell or shell 14 and comfort pads 17, 18, 19. Energy-absorbing liner 14 comprises a lower edge portion 16 and an upper portion 15. FIG. 2 is similar to energy-absorbing liner 14 of FIG. 3 in that FIG. 2 shows an energy-absorbing liner or inner shell or shell 11 which is preferably an inner shell like energy-absorbing liner 14 and is preferably disposed inside a hard outer shell. Less preferably shell 11 can be used without a hard outer shell 10 and with or without a thin outer microshell as known in the art. Alternatively shell 11 can be coated with a flexible coating or upholstered with leather or plastic film. Shell 11, similar to inner shell 14, comprises a lower edge portion 13 and an upper portion 12.

Figure 6:
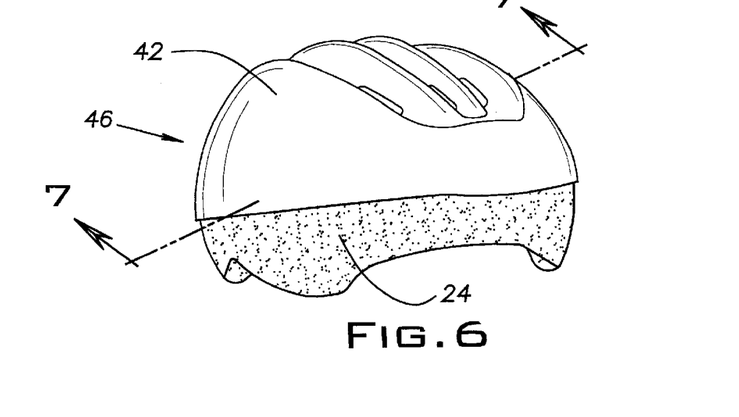
FIG. 6 is a perspective view of a protective helmet having the liner of FIG. 4.
Figure 7:
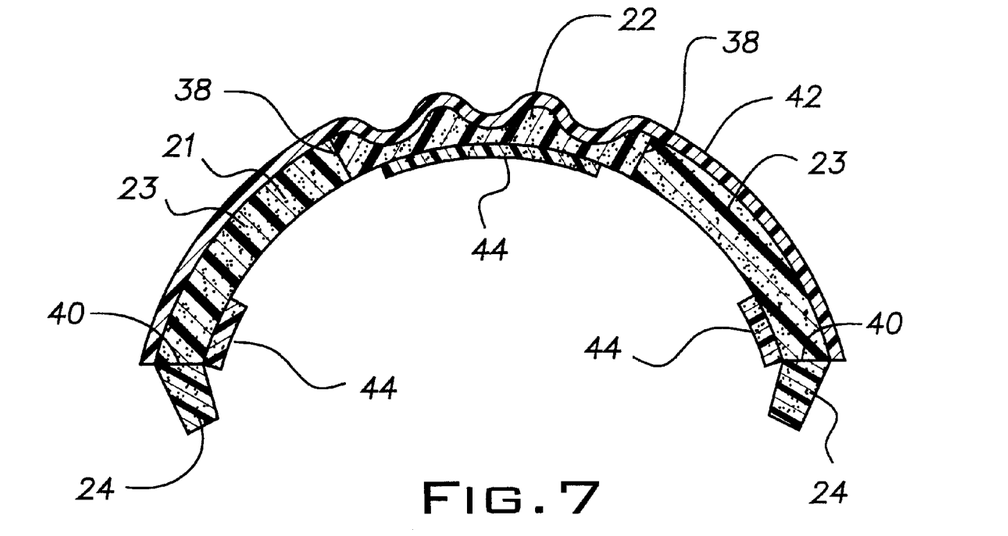
FIG. 7 is a cross sectional view taken along line 7—7 of FIG. 6.

With reference to FIGS. 4–5, there is shown an energy-absorbing or impact attenuating liner or inner shell or shell 21 having an upper portion 22, an intermediate portion 23 and a lower edge portion 24; each of these portions can be made of a foam having a different stiffness. Perimeter boundary 38 denotes the boundary or joint between upper portion 22 and intermediate portion 23. Perimeter boundary 40 denotes the boundary or joint between intermediate portion 23 and lower edge portion 24. The liner 21 has vent holes 26, 28, 30 and ribs 32, 34, 36 in upper portion 22. FIGS. 6 and 7 show a protective helmet 46 such as a bicycle helmet having the liner 21 of FIGS. 4–5 inside of a microshell 42 (which is a resin outer shell) as known in the art and also equipped with comfort pads 44.

Other than as set forth herein, the invented protective helmets have conventional features known in the art; for example, the invented helmets are equipped with a conventional chin strap or retention strap system as known in the art. The comfort pads 17, 18, 19, 44 are known in the art and are made of flexible high resilience polyurethane foam and help make the helmet snug on the wearer's head. The teachings of U.S. Pat. Nos. 5,088,130; 5,099,523; 5,298,208; 5,943,706; 6,070,271; 6,154,889 are incorporated herein by reference in their entirety.

The hard outer shell 10 is preferably made of a reinforced thermoset resin, the resin preferably being vinylester, polyester, epoxy, or other known thermoset resin. The thermoset resin is preferably reinforced with reinforcing fiber, preferably glass fiber (including glass matte, chopped glass, or random mat (non-woven strands of continuous fibers)), less preferably aramid fiber, Kevlar, carbon fiber, or other reinforcing fiber known in the art, such as fabric, cloth or fiber matting. The thermoset material is preferably 20–90, more preferably 30–80, more preferably 40–70, more preferably 50–70, weight percent reinforcing fiber, preferably compression molded. Preferably the thermoset outer shell has an elastic modules (ASTM D-638) and flexural strength (ASTM D-790) of 2.5 million to 5 million psi and is preferably about 2–3 or 2–4 mm or about 1/16–1/4 inches, or about 1/8 inches, thick. Such shells offer excellent penetration resistance.

Alternatively the hard outer shell 10 is made of reinforced thermoplastic resin, the resin preferably being polypropylene, polyethylene, polyethylene terephthalate (PET), nylon, polycarbonate, acrylonitril butadiene styrene (ABS), or vinyl.

The reinforcing fibers are as described above. The thermoplastic material is preferably 10–30 weight percent reinforcing fiber if injection molded and 30–50 weight percent reinforcing fiber in compression molded, and preferably the same thickness as the thermoset material above.

The hard outer shell material preferably has an elastic modulus (measured in psi) of greater than 300,000, more preferably greater than 400,000, more preferably greater than 500,000, more preferably greater than 600,000, more preferably greater than 700,000, more preferably greater than 800,000, and a flexural strength (measured in psi) of greater than 340,000, more preferably greater than 400,000, more preferably greater than 500,000, more preferably greater than 600,000, more preferably greater than 700,000, more preferably greater than 800,000. Optionally, the hard outer shell material can have an elastic modulus (psi) and/or flexural strength (psi) of greater than 1 million, 1.5 million, 2 million, 2.5 million or 3 million. The hard outer shell material preferably has percentage elongation at break of less than 30%, more preferably less than 20%, more preferably less than 10%, more preferably less than 5%, more preferably less than 3%, more preferably less than 2%, more preferably less than 1%, more preferably less than 0.2%.

Less preferably the outer shell 10 can be thermoplastic resin as described above, but without reinforcement, preferably injection molded and of similar thickness as described above.

Alternatively the outer shell 10, as well as microshell 42, can be a microshell as known in the art, such as 0.2–0.5 mm thick, made of thermoplastic resin (preferably polyethylene, polypropylene, acrylic, polycarbonate, PET, and vinyl) vacuum-formed in a thin film over the energy-absorbing liner.

The energy-absorbing liners 11, 14 and 21 are made of slow recovery viscoelastic polymeric foam. Viscoelasticity in energy-absorbing foams allows the material to deform under impact, dissipating a large amount of energy, yet to return slowly to the original shape essentially or substantially undamaged and with essentially or substantially original mechanical properties. For this reason the invented helmets are not "single impact" helmets like EPS, but rather can be used for many impacts. These energy-absorbing viscoelastic foams have low resiliency, that is, when compressed they return to their original shape, however, the return process takes place slowly. Many conventional flexible polyurethane foams regain their original size after compression within a fraction of a second.

Viscoelastic polymeric foams as known in the art can be used, such as those described in U.S. Pat. Nos. 4,158,087; 5,203,352; Re. U.S. Pat. No. 29,487; U.S. Pat. Nos. 4,193,396; and 4,722,946. (The contents of these patents and the patents cited in these patents, and the contents of Davies, O. Ll. and Mills, N. J., "The Rate Dependence of Confor Polyurethane Foams", *Cellular Polymers*, Vol. 18, No. 2 (1999) pp. 117–136, are incorporated herein by reference in their entirety). Suitably plasticized polymeric foams disclosed in U.S. Pat. No. Re. 29,487 can be used. Viscoelastic polyurethane foams, preferably polyether polyurethane foams, are preferred, such as those described in U.S. Pat. No. 4,158,087, suitably modified with latex modifiers as described therein. Viscoelastic polyvinylchloride foams can also be used. Those viscoelastic polymeric foams which are stiffer, more heavily plasticized and denser are preferred.

Alternatively, for the viscoelastic foam one can use a polyurethane foam having a glass transition temperature ($T_g$) of −10° C.–45° C., more preferably 0° C.–35° C., more preferably 10° C.–30° C., more preferably 15° C.–25° C., more preferably about 20° C. To prepare such viscoelastic polyurethane foams, preferably use a mixture of polyols having molecular weights ranging closer to or about 1000, as contrasted with a conventional flexible polyurethane foam which has a mixture of polyols having molecular weights ranging from 3000–6000.

The viscoelastic polymeric foams to be used in the invention are preferably compression rate sensitive such that, when the impact velocity increases from 4 m/s to 8 m/s, the stress at 20% strain increases 30% to 400%, more preferably 60% to 355%, more preferably 90% to 310%, more preferably 110% to 270%, more preferably 130% to 240%, more preferably 150% to 210%, more preferably 165% to 190%, more preferably about 175%. As used herein and in the claims, stress, stress at 20% strain, impact velocity, g forces and percent compression are to be measured in accordance with the test equipment and procedures in ASTM F1446-95a, modified as follows. A foam plaque measuring 5"×5"×1" (laid flat on a surface larger than 5"×5") is to be tested. A circular steel impactor measuring 4.5 inches in diameter is attached to the drop apparatus. The entire drop apparatus, including attached parts, headform, helmet, if any, etc, is to be maintained at the specified 5 kg mass. Unless otherwise specified the testing is to be conducted at 70° F. Four samples are to be tested at each impact velocity and the four readings averaged. Impact velocity is the speed of the impactor when it first contacts the foam plaque. 20% strain is achieved when a 1 inch thick sample is compressed to a thickness of 8/10 inch (ie, 2/10 inch ΔT÷10/10 inch To 20%). Using the above testing protocol, the stress can be measured at 20% strain. If the stress at 20% strain is 100 kPa when the impact velocity is 4 m/s and is 325 kPa when the impact velocity is 8 m/s, then the stress at 20% strain has increased 225% when the impact velocity increased from 4 m/s to 8 m/s (ie, 325−100=225; 225÷100=2.25 or 225%). As can be seen, the foam is harder to compress as the impact velocity increases.

The viscoelastic polymeric foam preferably demonstrates the compression rate sensitive performance characteristics mentioned above at 70° F. and also throughout the following temperature ranges: 60° F.–80° F., more preferably 30° F.–85° F., more preferably 10° F.–90° F., more preferably −10° F.–95° F., more preferably −18° F.–100° F., more preferably −18° F.–127° F., and also 50° F.–90° F., 40° F.–100° F., −18° F.–40° F., −15° F.–30° F., and −10° F.–20° F. The compression rate sensitivity of viscoelastic foam may be due to the high hysteresis of the polymer itself and that the cell walls are porous with some open cells. There may be bottlenecks squeezing the air out as the speed increases. This compression rate sensitivity becomes important when considering children participating in sports, as they may not approach the higher speeds or fall heights specified by the ASTM and other standards. It is also important when considering a beginner or novice in a sport where the number of falls during the learning period is much higher, and at lower speeds than the experienced participant.

The viscoelastic polymeric foams to be used preferably have, at 70° F. and an impact velocity of 6.26 m/s, a stress at 20% strain of at least 50, 70, 90, 110, 130, 150, 170, 190 or 210 kPa, preferably not more than 150, 175, 200, 250, 300, 400, 500 or 600 kPa, preferably about 128 kPa; these values indicate the stiffness of the foam. A microshell is preferably matched with a stiffer foam liner; a hard outer shell can frequently be matched with a less stiff foam.

A preferred viscoelastic polymeric foam is SunMate brand foam from Dynamic Systems Inc., (Leicester, N.C.) preferably "extra firm", less preferably "firm" or "T50E". Another preferred foam is Confor brand foam (preferably the stiffer grades such as green or, less preferably, the blue) available from E-A-R Specialty Composites, a division of Cabot Safety Corporation, or Tempur brand foam (preferably the stiffer grades) available from Fagerdala World Foams of Sweden. Other similar foams known in the art may be used, such as those described in *Cellular Polymers*, Vol. 18, No. 2 (1999) pp. 117–136, mentioned above, and those from Dow Chemical Co. and Bayer Corporation. Confor 47 foam can be used; it has a density of 92.8 kg/m$^3$. Confor 45 and Confor 42 foams can less preferably be used. Confor foams have mainly closed cells but with some open cells. The higher the percentage of closed cells, the stiffer it is. The viscoelastic foam used in the present invention preferably has a density of about 93 kg/m$^3$, less preferably±5, 10, 15, 20 or 25%.

The liners 11, 14 and 21 are preferably 0.25–3, more preferably 0.5–2.5, more preferably 0.75–2, more preferably 0.875–1.5, more preferably 0.75–1 or 1–1.25 or about 1, inches thick and can be with or without holes or slits or ribs to permit air circulation, ventilation, weight reduction, and different levels of protection. Bicycle helmets tend to be heavily ventilated. The shape and size of the liners can be any shape and/or size of foam layer or liner known in the art. Each liner 11, 14, 21 is preferably all viscoelastic foam as described herein, alternatively the foam portion of each liner is all viscoelastic foam. Less preferably each liner 11, 14, 21 is at least 95, 90, 80, 70, 60, 50 or 40 volume percent viscoelastic foam as described herein, or substantially all or a substantial portion (such as at least 30, 40, 50, 60 or 70 volume percent) being viscoelastic foam as described herein. For example, upper portion 22 could be nonviscoelastic foam and portions 23 and 24 could be viscoelastic foam.

The "footprint" of the impact area varies with impact site (i.e., smaller footprint area on edges of the helmet and on vents with larger footprint area on top of the helmet). Accordingly, energy-absorbing foam liner thickness and/or stiffness or compressibility can be varied at different locations on the helmet. Each liner need not be of uniform thickness but can be of variable thickness as known in the art, such as to permit holes, air circulation or ventilation pathways, or to provide more protection to preselected areas of the head, such as the back of the head, the forehead or the side of the head above the ear. For example, the liner can be thicker at the back of the head and at the forehead, but thinner on the top of the head. Also, the liner can be thicker around air holes.

Alternatively, or in addition to thickness variations, viscoelastic foam of different firmness, stiffness or compressibility can be placed or located at different locations on the liner 11,14,21 to provide more protection to preselected areas of the head. For example, it is preferred to make the lower edge portion of the liner, or the portion of the liner surrounding an air or ventilation hole, of a stiffer or harder to compress foam to provide more protection, since the footprint over which impact energy can be spread is smaller. For example, lower edge portions 13, 16 and 24 can be made of a harder to compress foam than the adjacent portions 12, 15 and 23, respectively. Also, upper portion 22, which has thin areas and areas with holes, can be made of a harder to compress foam than the adjacent portion 23. A liner can be made having 2, 3, 4, 5, 6, or more different stiffness viscoelastic foams therein.

As can be seen from the foregoing, the present invention comprises a helmet made with a viscoelastic foam layer or liner. The helmet can be any protective or sport helmet known in the art, including helmets for motorsports, motorcycling, auto racing, snowmobile, ATV, skiing, snowboarding, skateboarding, sky diving, bicycling, roller or inline skating, football, lacrosse, polo, hockey, equestrian, bobsled, rock climbing, kayaking, wresting and boxing (sparring). Simply take the known or prior art helmet, remove the existing or known energy-absorbing foam or system, and replace it with a layer of the energy-absorbing viscoelastic foam described herein.

Various aspects and feature of the invention are illustrated in the following Examples.

EXAMPLE 1

An energy-absorbing viscoelastic liner having a stiffer or harder to compress lower edge portion ("first foam") and an easier to compress upper portion ("second foam") was made (see, e.g., lower edge portion 16 and upper portion 15). Each foam consisted of two parts, the first being FIPS Polyol (Dynamic Systems, Inc.) mixed with DABCO 33-LV Catalyst ("Catalyst") (Dynamic Systems, Inc.), and the second part being Isonate 2143L Modified MDI ("Isonate") (Dynamic Systems, Inc.). The FIPS Polyol for SunMate Semi Rigid Foam is herein called Polyol 1. The FIPS Polyol for SunMate 5-pcf Foam is herein called Polyol 2. The difference between the two foams is the percentage of the Polyol and Isonate that are combined. Using a higher percentage of Isonate makes the foam harder to compress. In the liner of this Example, harder to compress foam (SunMate Semi Rigid Foam, Dynamic Systems, Inc.) was used on the lower edge portion, and easier to compress foam (SunMate 5-pcf Foam, Dynamic Systems, Inc.) was used on the upper portion. The lower edge portion was made using about 65 weight percent of a mixture of Polyol 1 and Catalyst (100 parts Polyol 1 plus about 0.75 parts Catalyst) and about 35 weight percent Isonate. The upper portion was made using about 68 weight percent of a mixture of Polyol 2 and Catalyst (100 parts Polyol 2 plus about 0.75 parts Catalyst) and about 32 weight percent Isonate. In less preferred embodiments the Polyol 1/Catalyst mixture can be, rather than 65 weight percent, 62–68 or 60–70 weight percent. In less preferred embodiments the Polyol 2/Catalyst mixture can be, rather than 68 weight percent, 60–72 or 60–75 weight percent. Other viscoelastic foams having up to ±10%, 20%, 30%, 40% or 50% of the performance characteristics of these foams may preferably be used.

The first injection into the mold was the SunMate Semi Rigid Foam to create the stiffer lower edge portion of the liner. After it partially cured for 5–10 minutes, the SunMate 5-pcf Foam was injected and the entire liner was allowed to cure for four hours. Alternatively a two-part mold can be used; cast the stiffer bottom part of the liner in one mold, allow it to partially cure (usually 5–10 minutes), remove the top of the mold, and replace it with the mold for the remainder of the liner. Then inject the softer foam into the top of the second mold and cure. Alternatively mold either part (top or bottom) and allow to cure entirely, then use the molded part as an insert in the molding of the second part.

The stiffer foam extended in a band around the lower edge of the liner about 1 inch up from the bottom edge. (See portions 13, 16). Preferably this band extends up from the bottom edge about 0.025–3, more preferably about 0.5–2, more preferably about 0.75–1.5, inches.

EXAMPLE 2

In accordance with ASTM F1446-95a (modified as described above), three plastic foams were tested: Sample A was SunMate 5-pcf Foam (viscoelastic foam having a density of 5 lbs/ft$^3$ (pcf)); Sample B was 4.7 pcf EPP; Sample C was 5.0 pcf EPS. Velocity was the velocity of the impactor when the foam was first contacted. Average g's were the calculated g forces. (10 g's=10 times the force of gravity).

| Velocity (m/s) | Ave. g's for Sample A | Ave. g's for Sample B | Ave g's for Sample C |
|---|---|---|---|
| 4.0 | 101.35 | 232.07 | 234.22 |
| 4.5 | 122.37 | 248.24 | 265.29 |
| 5.0 | 143.39 | 264.41 | 296.36 |
| 5.5 | 178.01 | 270.95 | 274.23 |
| 6.0 | 212.62 | 277.48 | 252.1 |
| 6.5 | 255 | 288 | 260 |

This shows that EPP and EPS require a higher force to compress and that the helmet wearer will experience higher g forces, compared to viscoelastic foam. At 5.0 m/s, EPS was within 4 g's of exceeding the 300 g limit prescribed by the ASTM bike and ski helmet standard.

EXAMPLE 3

Samples A, B and C are the same as in Example 2. The same modified ASTM F1446-95a was used. Head Injury Criterion (HIC) is known in the art and is a measurement of head injury risk, factoring in g's experienced, combined with the amount of time at each g level. HIC Overall means HIC calculated for the entire impact event, averaging in the off peak parts of the deceleration curve. HIC 3 ms clip means as measured in the automotive industry. In the automotive industry a 3 millisecond (ms) sliding clip is used, which calculates the HIC for the worst 3 milliseconds of the impact event. The auto industry has determined that at an HIC value of 1000 the person has a 16% chance of receiving a life-threatening brain injury, and at an HIC value of 1500 has a 56% chance of receiving a life-threatening brain injury. The higher the HIC, the higher the risk of brain injury. The results of Samples A, B and C are as follows.

| Velocity (m/s) | Sample A, HIC Overall | Sample A, HIC 3 ms clip | Sample B, HIC Overall | Sample B, HIC 3 ms clip | Sample C, HIC Overall | Sample C, HIC 3 ms clip |
|---|---|---|---|---|---|---|
| 4.0 | 185.48 | 175 | 674.37 | 945 | 248.92 | 417 |
| 4.5 | 280.51 | 326.5 | 827.5 | 1183 | 779.48 | 1100 |
| 5.0 | 375.53 | 478 | 980.62 | 1421 | 1310.04 | 1627 |
| 5.5 | 503.29 | 788 | 1079.47 | 1705 | 1298.28 | 1680 |
| 6.0 | 631.05 | 1098 | 1178.32 | 1989 | 1286.52 | 1734 |
| 6.5 | 810 | 1688 | 1352.5 | 2196 | 1438.27 | 1978.5 |
| 7.0 | 1145.13 | 2278 | 1526.68 | 2403 | 1590.02 | 2223 |

This shows that viscoelastic foam significantly reduces the HIC value in an impact, compared to EPP or EPS.

EXAMPLE 4

In this test Samples A and C from Example 2 were tested per the modified ASTM F1446-95a described above. Stress at 20% strain was measured at 70° F. at different impact velocities. The results are as follows. Percent change is measured by comparison with the reading at 4 m/s.

| Sample | Velocity (m/s) | Stress at 20% Strain | Percent Change |
|---|---|---|---|
| A | 4.0 | 86184.47 Pa | 0% |
| C | 4.0 | 517106.8 Pa | 0% |
| A | 5.0 | 97388.45 Pa | 13% |
| C | 5.0 | 530034.5 Pa | 2.5% |
| A | 6.0 | 118796.7 Pa | 38% |
| C | 6.0 | 535309 Pa | 3.5% |
| A | 7.0 | 162785.2 Pa | 89% |
| C | 7.0 | 551373.7 Pa | 6.6% |
| A | 8.0 | 237662.3 Pa | 176% |
| C | 8.0 | 565163.3 Pa | 9.3% |

This illustrates the viscoelastic foam's ability to compensate for different impact velocities. Stress at 20% strain values for EPS change very little from 4 to 8 m/s impact speeds; the viscoelastic foam exhibits a 176% increase in stress at 20% strain as impact speed increases from 4 m/s to 8 m/s. As impact speed increases, the viscoelastic foam provides more resistance or stiffness.

EXAMPLE 5

Samples A, B and C of Example 2 (1 inch thick) were tested according to modified ASTM F1446-95a to show percent compression at different impact velocities. The results are as follows.

| Velocity (m/s) | Sample A % Compression | Sample B % Compression | Sample C % Compression |
|---|---|---|---|
| 4.0 | 62 | 31 | 40 |
| 4.5 | 68.5 | 34.5 | 38 |
| 5.0 | 75 | 38 | 36 |
| 5.5 | 79.5 | 43 | 43.5 |
| 6.0 | 84 | 48 | 51 |
| 6.5 | 88 | 53.5 | 57.5 |

-continued

| Velocity (m/s) | Sample A % Compression | Sample B % Compression | Sample C % Compression |
|---|---|---|---|
| 7.0 | 92 | 59 | 64 |
| 7.5 | 95.5 | 63.5 | 67.5 |
| 8.0 | 99 | 68 | 71 |

The viscoelastic foam compressed up to 99% at 8 m/s, thus fully using the foam's energy-absorbing properties within the 1 inch thickness. EPS and EPP only compressed about 70% at 8 m/s.

EXAMPLE 6

Helmet D was a 5.0 pcf viscoelastic foam liner (SunMate 5-pcf Foam) inside a fiberglass reinforced polypropylene shell. Helmet E was a 5.0 pcf EPS liner inside a polycarbonate shell. The shells and liners were molded in the same shape in order to compare only the impact attenuation performance. In accordance with the modified ASTM F1446-95a, the results are as follows.

| Velocity (m/s) | Average g's Helmet D | Average g's Helmet E |
|---|---|---|
| 4.0 | 133.15 | 185.5 |
| 4.5 | 134.15 | 216.09 |
| 5.0 | 135.14 | 246.67 |
| 5.5 | 150.69 | 279.6 |
| 6.0 | 166.24 | 312.53 |
| 6.5 | 185 | 320 |

The benefits of the present invention are apparent, as g forces were less.

EXAMPLE 7

Helmets D and E were tested as the foams were tested in Example 3 for HIC Overall and HIC 3 ms clip. The results are as follows.

| Velocity (m/s) | Helmet D HIC Overall | Helmet D HIC 3 ms clip | Helmet E HIC Overall | Helmet E HIC 3 ms clip |
|---|---|---|---|---|
| 4.0 | 406.46 | 567 | 603.79 | 898 |
| 4.5 | 398.55 | 566 | 679.87 | 1199 |
| 5.0 | 390.64 | 568 | 755.94 | 1500 |
| 5.5 | 488.46 | 708 | 1006.21 | 2117 |
| 6.0 | 586.28 | 848 | 1256.48 | 2734 |
| 6.5 | 735 | 1050 | 1490 | 2900 |

The benefits of the present invention can be seen from the lower HIC values.

EXAMPLE 8

Helmet F had a 0.125 inch thick fiberglass reinforced (40 weight percent random glass matte) polypropylene outer shell and a viscoelastic foam liner as described in Example 1. Helmet G had the same liner as Helmet F and a 0.015–0.02 inch thick sheet-extruded vinyl microshell vacuum-formed to meet the same contour as Helmet F. It was trimmed to stop above the bottom of the foam liner and was taped around the perimeter to hold it in place. Double-sided tape between the shell and liner held the shell and liner together. Helmets H and J were the same as Helmets F and G, respectively, except that Helmets H and J had an EPS liner. In accordance with the modified ASTM F1446-95a, these 4 helmets were tested at 6.5 m/s using the curbstone anvil. The results were as follows.

| Helmet | F | G | H | J |
|---|---|---|---|---|
| g force | 180.71 | 262.73 | 315.18 | 720.06 |
| HIC Overall | 447.3 | 537.92 | 853.47 | 954.88 |
| HIC 3 ms clip | 1011 | 1283 | 1648 | 2789 |

The viscoelastic foam liner performs much better, since g forces and HIC values are lower.

Although the preferred embodiments of the invention have been shown and described, it should be understood that various modifications and changes may be resorted to without departing from the scope of the invention as disclosed and claimed herein.

What is claimed is:

1. A protective helmet comprising an energy-absorbing shell, said energy-absorbing shell comprising a first viscoelastic polymeric foam, said first viscoelastic polymeric foam being a compression rate sensitive foam such that, when an impact velocity increases from 4 m/s to 8 m/s, the stress at 20% strain increases 30% to 400%.

2. A helmet according to claim 1, wherein said helmet further comprises a resin outer shell.

3. A helmet according to claim 2, wherein said resin outer shell is a hard outer shell or a microshell.

4. A helmet according to claim 2, wherein said energy-absorbing shell is an energy-absorbing liner comprising viscoelastic polymeric foam having, at, an impact velocity of 6.26 m/s, a stress at 20% strain of 50–600 kPa.

5. A helmet according to claim 2, wherein said energy-absorbing shell comprising said first viscoelastic polymeric foam is an energy absorbing liner.

6. A helmet according to claim 5, wherein said liner further comprises a second viscoelastic polymeric foam which is such that, when the impact velocity increases from 4 m/s to 8 m/s, the stress at 20% strain increases 30% to 400%, said second viscoelastic polymeric foam having a different stiffness than said first viscoelastic polymeric foam.

7. A helmet according to claim 6, wherein said second viscoelastic polymeric foam (1) is stiffer than said first viscbelastic polymeric foam and (2) forms a lower edge portion of said liner.

8. A helmet according to claim 4, said viscoelastic polymeric foam being such that, when the impact velocity increase from 4 m/s to 8 m/s, the stress at 20% strain increases 90% to 310%.

9. A helmet according to claim 5, wherein said helmet is adapted to be worn by a participant in an activity selected from the group consisting of bicycling, downhill skiing, and snowboarding.

10. A helmet according to claim 6, wherein said second viscoelastic polymeric foam (1) is stiffer than said first viscoelastic polymeric foam and (2) surrounds a ventilation hole in said liner.

11. A helmet according to claim 5, wherein said resin outer shell is a hard outer shell made of reinforced resin.

12. A helmet according to claim 5, wherein said helmet is adapted to be worn by a participant in an activity selected from the group consisting of football, lacrosse, hockey, rock climbing and kayaking.

13. A helmet according to claim 2, wherein said foam is polyurethane foam.

14. A helmet according to claim 2, wherein said viscoelastic foam has a glass transition temperature ($T_g$) of −10° C.–45° C.

15. A helmet according to claim 1, wherein said first viscoelastic polymeric foam demonstrates said compression rate sensitivity throughout the temperature range of −18° F.–100° F.

16. A helmet according to claim 1, said first viscoelastic polymeric foam being a slow recovery viscoelastic polymeric foam.

17. A helmet according to claim 1, said energy-absorbing shell comprising a first portion and a second portion, said first portion comprising said first viscoelastic polymeric foam, said second portion comprising a second viscoelastic polymeric foam, said first viscoelastic polymeric foam being stiffer than said second viscoelastic polymeric foam.

18. A helmet according to claim 1, said first viscoelastic polymeric foam having a stress of at least 50 kPa and not more than 600 kPa at 70° F. and 20% strain for an impact velocity of 6.26 m/s.

19. A helmet according to claim 1, said first viscoelastic polymeric foam having a density of 93 kg/m³±25%.

20. A helmet according to claim 17, said energy-absorbing shell further comprising a third portion arranged adjacent said first and said second portions, said third portion comprising a third viscoelastic polymeric foam having a stiffness different from each of said first and said second viscoelastic polymeric foams.

* * * * *

UNITED STATES PATENT AND TRADEMARK OFFICE
CERTIFICATE OF CORRECTION

PATENT NO.     : 6,453,476 B1
DATED          : September 24, 2002
INVENTOR(S)    : Dan T. Moore, III and Debra R. Grimes It is certified that error appears in the above-identified patent and that said Letters Patent is hereby corrected as shown below:

<u>Title page,</u>
Item [75], Inventor, should read as follows:
-- [75] Inventor: Dan T. Moore, Cleveland Heights, OH (US) and Debra R. Grimes, Cleveland Heights, OH (US) --

Signed and Sealed this

Thirteenth Day of April, 2004

JON W. DUDAS
*Acting Director of the United States Patent and Trademark Office*